Figure 1:
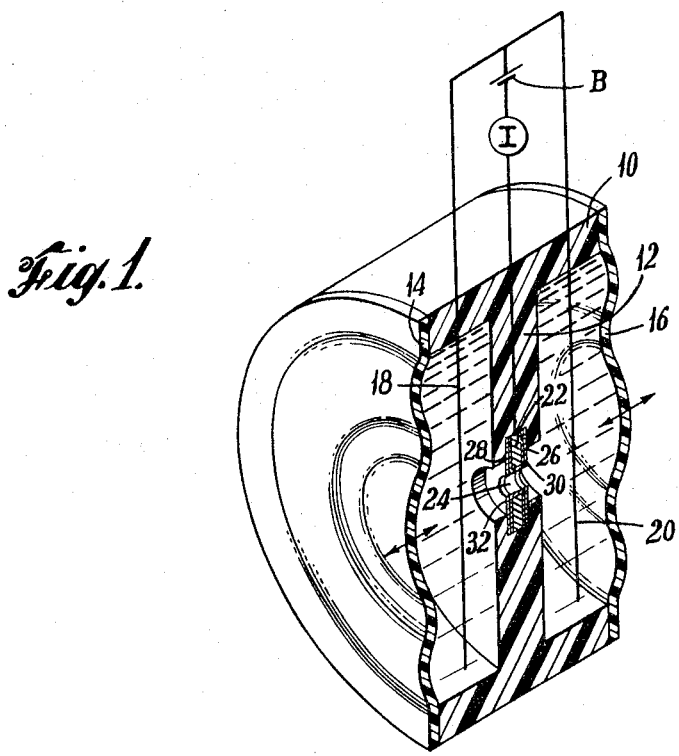

Jan. 3, 1967  N. N. ESTES ETAL  3,296,504

ELECTRODES FOR ELECTROCHEMICAL LOGARITHMIC DETECTOR UNITS

Filed Nov. 29, 1963

INVENTORS
NELSON N. ESTES
GEORGE T. KEMP

BY *John R. Hakenty*
ATTORNEY

United States Patent Office 3,296,504
Patented Jan. 3, 1967

3,296,504
ELECTRODES FOR ELECTROCHEMICAL
LOGARITHMIC DETECTOR UNITS
Nelson N. Estes and George T. Kemp, Austin, Tex., assignors to Union Carbide Corporation, a corporation of New York
Filed Nov. 29, 1963, Ser. No. 326,903
4 Claims. (Cl. 317—230)

This invention relates to electrodes for use in electrochemical logarithmic detector units.

The basic principles of electrochemical detectors are described in a paper by Hurd and Lane, "Principles of Very Low Power Electrochemical Control Devices," Journal of the Electrochemical Society, volume 104, No. 12, December 1957. One type of detector has the property that the electric current (or the voltage across a series resistance) in an external biasing circuit is a logarithmic function of the volume flow rate of fluid through a detecting element. This type is called a logarithmic or log detector. It is used for measuring physical signals, such as acoustical pressure.

Generally, detectors of this type comprise a housing divided into two compartments, one wall of each compartment having a flexible diaphragm therein. The other wall is a common partition having an aperture in which is mounted a detecting electrode having an orifice for the transmission of liquid from one compartment to the other. Both compartments are filled with a liquid electrolyte containing a reversible redox system, and an electrode is mounted in each of the compartments. The detecting electrode is usually made the cathode and the electrodes in each of the compartments are made the anodes in an external biasing circuit. When properly biased, a measured species (ions) of the redox system slowly diffuses to the detecting cathode where it undergoes electrochemical reaction. Now, if a signal such as an acoustical pressure is applied on the flexible diaphragm defining one wall of either compartment, the solution in that compartment tends to flow through the orifice, thereby making a greater quantity of the measured species available for electrochemical reaction at the detecting cathode. Thus, in response to a pressure, an electric current is produced and can be measured. The current observed at a fixed voltage increases with applied pressure and, due to the configuration of the orifice, is a logarithmic function of the pressure input.

Heretofore, the detecting cathode has been composed of a platinum disc having a small orifice at its center. Since the only effective part of the cathode is the periphery or wall of the orifice, it has been the practice to insulate all of the surfaces of the cathode, exclusive of the orifice, with a thin layer of glass.

Cathodes of the foregoing type have performed satisfactorily, but nonetheless they suffer from certain disadvantages. One disadvantage is the tendency of platinum to dissolve in the electrolyte solution of the redox system and to deposit on the surfaces of the cathode orifice, changing its size and shape and in the most extreme cases, even blocking the orifice to the passage of fluid. Another disadvantage is the tendency of the glass to dissolve in the electrolyte solution, often exposing portions of the insulated platinum disc to the electrolyte and thereby effecting the performance of the detector.

It is the principal object of this invention to provide an improved detecting electrode for a logarithmic detector unit.

Figure 2:
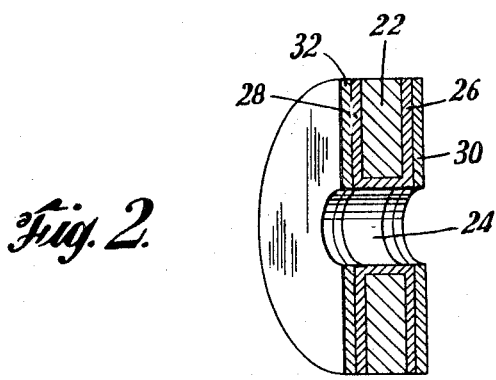

In the accompanying drawing:

FIGURE 1 is an isometric view, part being broken away, of a logarithmic detector unit provided with a detecting cathode embodying the invention; and FIGURE 2 is a similar view greatly enlarged of the cathode used in the device of FIGURE 1.

In accordance with the invention, an electrode is provided comprising a sheet or disc having an orifice therein and having at least the surface portions thereof composed of a material selected from the group consisting of the carbides, nitrides, silicides and borides of a transition metal of Groups IVB, VB and VIB of the Periodic Table. The exposed surfaces of the electrode, exclusive of the orifice, are insulated by a thin layer of an oxide of the transition metal.

Electrodes made of the Groups IVB, VB and VIB transition metal compounds indicated above are broadly disclosed and claimed in the co-pending application Serial No. 324,275 of Robert A. Powers et al., filed on November 18, 1963. As described therein, these transition metal compounds have been found to possess a high electrical conductivity and, furthermore, are virtually inert to an electrolyte solution of a reversible redox system. They are therefore ideally suited for use as the detecting electrode of a logarithmic or log detector. The transition metals of Groups IV$b$, VB and VIB are hafnium, titanium, zirconium, niobium, tantalum, vanadium, chromium, molybdenum and tungsten. The most preferred compounds for use as electrodes are those of tantalum, zirconium, niobium and hafnium. Of these, tantalum carbide is preferred. Illustrative compounds for the electrode of the invention are the following.

| Carbides: | Nitrides: | Silicides: | Borides: |
|---|---|---|---|
| TaC | TiN | TaSi$_2$ | TiB$_2$ |
| NbC | ZrN | TiSi$_2$ | TiB |
| Mo$_2$C | NbN | ZrSi$_2$ | ZrB$_2$ |
| W$_2$C | Nb$_2$N | Cr$_3$Si$_2$ | ZrB |
| WC | TaN | | NbB$_2$ |
| ZrC | CrN | | NbB |
| VC | | | Mo$_2$B |
| HfC | | | α-MoB |
| TiC | | | β-MoB |
| Cr$_3$C$_2$ | | | Mo$_2$B$_5$ |
| | | | MoB$_2$ |
| | | | CrB |

For conciseness, the invention will now be described in greater detail having reference to a log detector utilizing a cathode of tantalum carbide, although it will be understood that the cathode may be made of any one of the compounds tabulated above.

Referring to the drawing, a log detector embodying the invention comprises a housing 10 divided into two compartments by an apertured partition 12, each of the compartments having as one wall thereof one of a pair of flexible diaphragms 14, 16. In each compartment is one of a pair of electrodes 18, 20 connected to a biasing battery B and constituting anodes for each compartment. A cathode 22 having an orifice 24 at its center is positioned in the aperture of the partition 12. The cathode 22 is composed of tantalum and, as best seen in FIGURE 2, is provided on each side with a layer 26, 28 of tantalum carbide. Tightly adhered to the tantalum carbide layers 26, 28, except in the orifice 24, is a coating 30, 32 of tantalum oxide. Both compartments of the device are filled with an electrolyte composed of an aqueous solution containing a reversible redox couple.

To illustrate the practice of the invention, a cathode was made in the following manner: A disc of tantalum metal approximately ⅛ inch in diameter was punched from a tantalum sheet having an average thickness of about 0.002 inch. An orifice approximately 0.015 inch in diameter was then punched through the center of the disc. Since tantalum is relatively soft, it is desirable to use a punch in conjunction with a flat plastic sheet, whereby the punch is first passed through the tantalum metal and then through the plastic sheet, essentially forming a sort of die for each orifice that is punched.

The tantalum metal disc was carbonized as follows: The disc was placed in a furnace which was pumped down with a high vacuum pump. The temperature of the furnace was raised to about 2200° C. in order to degas the disc and then was reduced to 1500° C. A gaseous mixture (1:5 mixture) of ethylene and hydrogen was inserted into the furnace at a gas pressure of about 3 or 4 mm. Hg and held for about one hour. The furnace was then pumped down again and the temperature raised to about 2000° C. This temperature was held for about 15 minutes and then reduced to 1500° C. A gaseous mixture (1:5 mixture) of ethylene and hydrogen was again inserted into the furnace at a gas pressure of about 3 or 4 mm. Hg and held for one hour. The pump was then started and the furnace temperature reduced to 600° C. in 15 seconds. The pump was allowed to run for 15 minutes at this temperature. Thereafter, the furnace was turned off and pumping was continued for at least 20 minutes, after which the disc was removed from the furnace.

Surface insulation of the disc was accomplished by selective oxidation of the outer surface only. The orifice was protected from oxidation by flowing argon therethrough while the disc was being heated by induction. The outer tantalum carbide surface was then oxidized by heating to about 950° C. while surrounded by normal room air. Generally, the cathode insulation will not cover the tantalum carbide exposed at the orifice edge unless desired, but rather will start about 0.001 inch back from the edge of the orifice as shown in FIGURE 2.

Cathodes prepared as described above have proven to yield consistently uniform response over a variety of conditions when utilized in a log detector of the type illustrated in FIGURE 1. In tests of such devices, the electrolyte was an aqueous solution iodine and potassium iodide comprising a reversible redox system.

It will be apparent to those skilled in the art that the foregoing discussion is merely illustrative and that many variations may be made in the disclosed construction without departing from the spirit and scope of the invention. For instance, it is entirely possible to construct the cathode of the invention from a substrate of tantalum or another base metal or to make the cathode entirely of tantalum carbide if desired.

A standard Periodic Table is described in "Handbook of Chemistry" by Lange, 9th edition, published 1956, pages 56 and 57, and is to be referred to in the classification of the transition metals which may be used in the practice of the invention.

We claim:

1. An electrode for a logarithmic detector having an orifice therein and having at least the side surface portions and the surface defining said orifice composed of a material selected from the group consisting of the carbides, nitrides, silicides and borides of a transition metal selected from the group consisting of hafnium, titanium, zirconium, niobium, tantalum, vanadium, chromium, molybdenum and tungsten, and an insulating coating of an oxide of a transition metal selected from the group of said metals on said side surface portions and terminating at the extremities of said orifice.

2. An electrode for a logarithmic detector comprising a metal substrate having an orifice therein and having a surface layer at least on each of its opposite sides and the surface defining said orifice of a compound selected from the group consisting of the carbides, nitrides, silicides and borides of a transition metal selected from the group consisting of hafnium, titanium, zirconium, niobium, tantalum, vanadium, chromium, molybdenum and tungsten, and an insulating coating of an oxide of a transition metal selected from the group of said metals on said surface layer and terminating at the extremities of said orifice.

3. An electrode as defined by claim 2 in which said substrate is composed of a transition metal selected from the group consisting of hafnium, titanium, zirconium, niobium, tantalum, vanadium, chromium, molybdenum and tungsten.

4. An electrode for a logarithmic detector comprising a tantalum metal disc having an orifice therein and having a continuous surface layer of tantalum carbide on each of its opposite sides and the surface defining said orifice, and an insulating coating of tantalum oxide on said surface layer but terminating at the extremities of said orifice.

No references cited.

JOHN W. HUCKERT, *Primary Examiner.*

D. J. KALLAM, *Assistant Examiner.*